(12) United States Patent
Chien

(10) Patent No.: US 6,570,759 B1
(45) Date of Patent: May 27, 2003

(54) GUIDE/EJECTOR DEVICE FOR COMPUTER

(75) Inventor: Chung-Chi Chien, Taipei (TW)

(73) Assignee: Compal Electronics, Inc., Taipei City (TW)

(*) Notice: Subject to any disclaimer, the term of this patent is extended or adjusted under 35 U.S.C. 154(b) by 0 days.

(21) Appl. No.: 09/996,747

(22) Filed: Nov. 30, 2001

(51) Int. Cl.$^7$ ................................................ G06F 1/16
(52) U.S. Cl. .................... 361/686; 361/683; 361/727
(58) Field of Search ............................. 361/683–686, 361/726, 727, 737, 741, 754, 798, 756, 802

(56) References Cited

U.S. PATENT DOCUMENTS 5,583,745 A * 12/1996 Uwabo et al. ............ 361/685
5,692,208 A * 11/1997 Felcman et al. ............ 395/800

* cited by examiner

*Primary Examiner*—Darren Schuberg
*Assistant Examiner*—Yean-Hsi Chang
(74) *Attorney, Agent, or Firm*—Foley & Lardner

(57) ABSTRACT

A guide/ejector device for a computer includes a guide unit. The guide unit includes two longitudinal guiding tracks made of a shockproof rubbery material. The guiding tracks are parallel to each other, and define a receiving space adapted to receive a hard disk. Each of the guiding tracks has a first end portion adapted to be disposed adjacent to a disk door, and an opposite second end portion. The first end portions of the guiding tracks define an opening adapted for insertion of the hard disk into the receiving space.

6 Claims, 4 Drawing Sheets

GUIDE/EJECTOR DEVICE FOR COMPUTER

BACKGROUND OF THE INVENTION

1. Field of the Invention

The invention relates to a guide/ejector device for a computer, more particularly to a guide/ejector device which provides shockproofing and ejecting effects for a hard disk. This invention also relates to an electronic apparatus, such as a portable personal computer, including the guide/ejector device.

2. Description of the Related Art

Conventional methods of installing a hard disk into a portable personal computer can be generally classified into two types. In the first type, the hard disk is constructed in the form of a personal computer memory card (PCMCIA card) so as to permit insertion of the hard disk into a PCMCIA slot for connecting electrically to the portable personal computer. However, since the PCMCIA slot is devoid of a shockproofing mechanism, the data stored in the hard disk will be destroyed when the hard disk is subjected to shock. In the second type, the hard disk is fixed directly in the portable personal computer for connecting electrically to a computer circuit board. Portions of the hard disk are covered with a shockproof rubbery material so as to provide the hard disk with a shockproof effect. However, since the hard disk is fixed within the portable personal computer, it is difficult to change the hard disk when required.

SUMMARY OF THE INVENTION

Therefore, the object of the present invention is to provide a guide/ejector device for a computer, which provides shockproofing and ejecting effects for a hard disk. Another object of this invention is to provide an electronic apparatus, such as a portable personal computer, including the guide/ejector device.

Accordingly, the guide/ejector device for a computer of this invention includes a guide unit and an ejecting mechanism. The computer includes a circuit board, an electrical connector connected electrically to the circuit board, and a disk door.

The guide unit includes two longitudinal guiding tracks made of a shockproof rubbery material. The guiding tracks are parallel to each other, and define a receiving space adapted to receive the hard disk. Each of the guiding tracks has a first end portion adapted to be disposed adjacent to the disk door, and an opposite second end portion. The first end portions of the guiding tracks define an opening adapted for insertion of the hard disk into the receiving space when connecting the hard disk to the electrical connector.

The ejecting mechanism is disposed adjacent to the second end portions of the guiding tracks and is adapted to eject the hard disk from the electrical connector.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
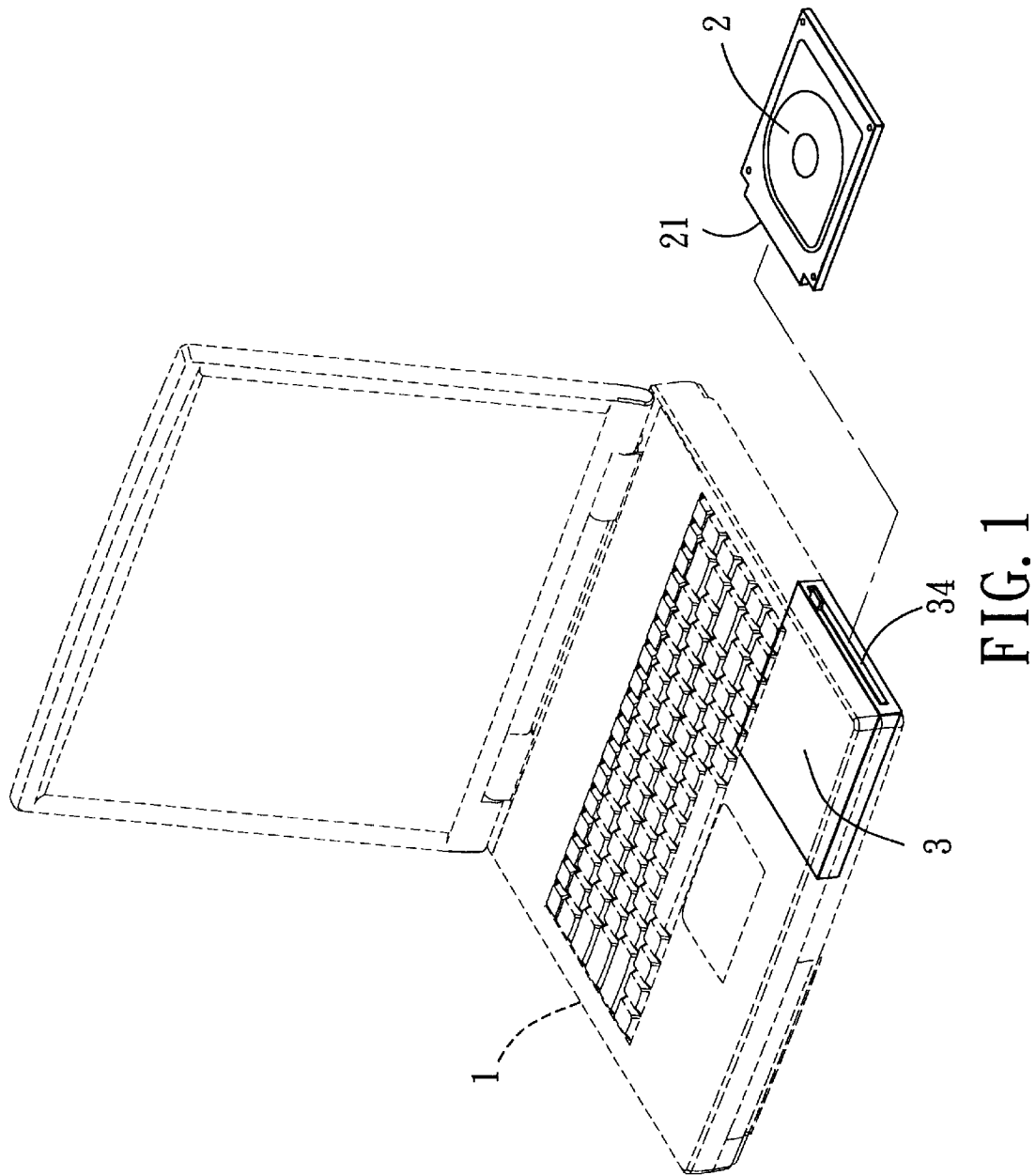
FIG. 1 is a perspective view of the preferred embodiment of a guide/ejector device according to this invention when disposed in a portable personal computer.
Figure 2:
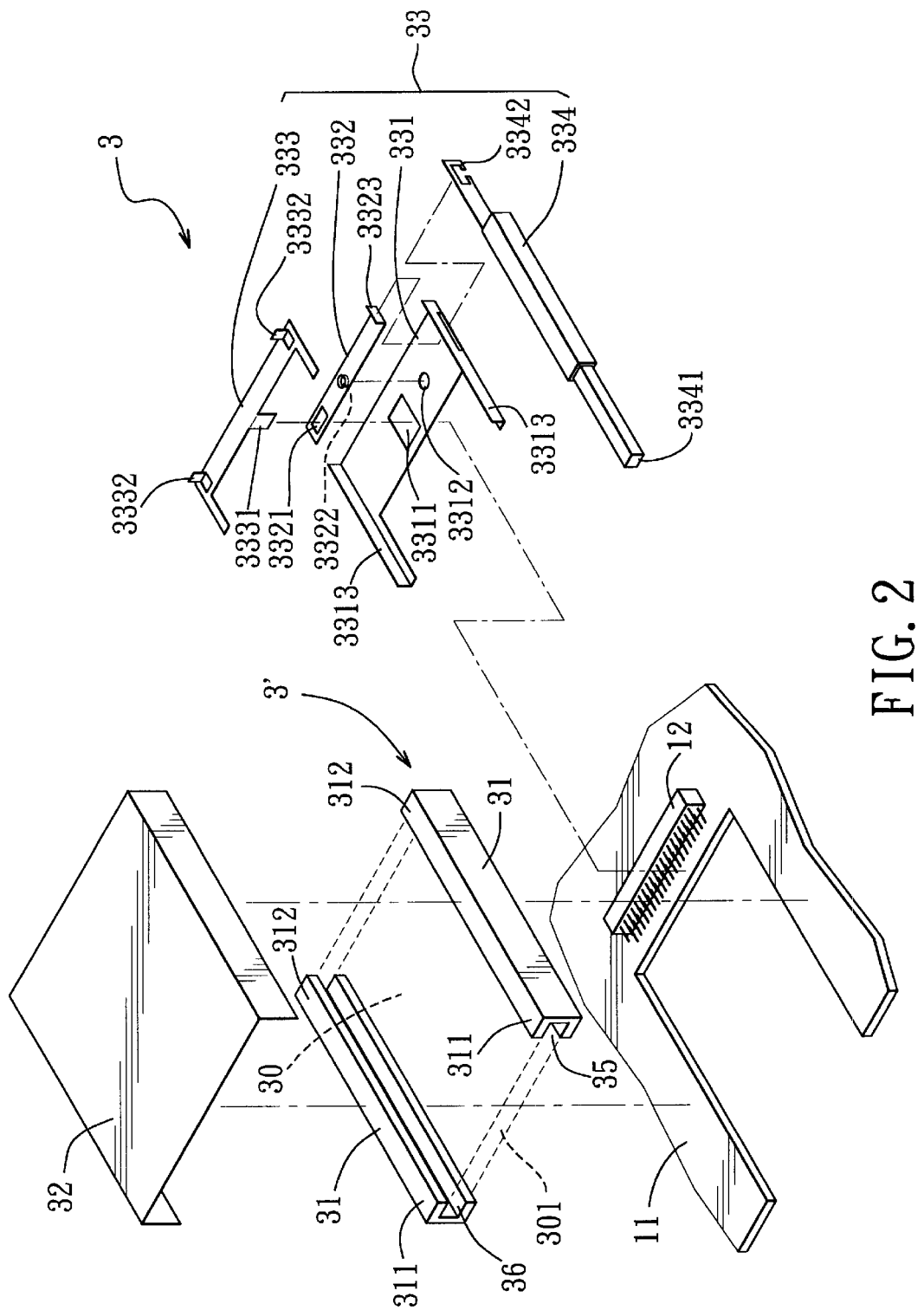
FIG. 2 is an exploded perspective view of the preferred embodiment.

Referring to FIGS. 1 and 2, the preferred embodiment of a guide/ejector device 3 according to this invention is shown to be disposed in a portable personal computer, which includes a housing 1, a hard disk 2, a circuit board 11 disposed in the housing 1, and an electrical connector 12 mounted on and connected electrically to the circuit board 11. The hard disk 2 is changeable, and has an electrical connecting end portion 21 for connecting electrically the hard disk 2 to the electrical connector 12. The hard disk 2 can thus be connected electrically to the circuit board 11 for data storage and retrieval purposes.

Referring again to FIG. 2, the guide/ejector device 3 includes a guide unit 3', an ejecting mechanism 33, and a top shell 32.

The guide unit 3' includes two longitudinal guiding tracks 31 which are made of a shockproof rubbery material, and which are mounted on the circuit board 11. The guiding tracks 31 are parallel to and opposite from each other, and define a receiving space 30 adapted to receive the hard disk 2. Each of the guiding tracks 31 has a first end portion 311 adapted to be disposed adjacent to a disk door 34 (see FIG. 1) on the housing 1, and an opposite second end portion 312. The first end portions 311 of the guiding tracks 31 define an opening 301 which is communicated to the exterior of the housing 1 via the disk door 34, and which is adapted for insertion of the hard disk 2 into the receiving space 30 when connecting the hard disk 2 to the electrical connector 12. Furthermore, each of the guiding tracks 31 has a longitudinally extending recess 35, and two opposed slide faces 36 confining the recess 35.

The top shell 32, which is made of a metal sheet, spans and connects the guiding tracks 31.

The ejecting mechanism 33 is used to eject the hard disk 2 from the receiving space 30 when it is desired to replace the hard disk 2. The configuration of the ejecting mechanism 33 is well known to those skilled in the art. For the purpose of illustration, one type of the ejecting mechanism 33 is shown in FIG. 2. The ejecting mechanism 33 is disposed adjacent to the second end portions 312 of the guiding tracks 31 and is adapted to eject the hard disk 2 from the electrical connector 12. The ejecting mechanism 33 includes a guiding member 331, a pivot plate 332, a push plate 333, and a pushing bar 334. The guiding member 331 is mounted on the circuit board 11 and is located between the electrical connector 12 and the guiding tracks 31. The guiding member 331 has a positioning hole 3312, a guiding opening 3311 extending along the longitudinal direction of the guiding tracks 21, and two opposite ends formed with two guide arms 3313 in alignment with the guiding tracks 31. The pivot plate 332 is disposed on the guiding member 331, and has a coupling opening 3321 corresponding to the guiding opening 3311, a pivot shaft 3322 inserted into the positioning hole 3312, and an actuated portion 3323 opposite to the coupling opening 3321. The pivot plate 332 is pivotally connected to the guiding member 331 by inserting the pivot shaft 3322 into the positioning hole 3312 so as to guide backward and forward movements of the push plate 333. The push plate 333 is mounted on the pivot plate 332, and has a flange 3331 extending downward and into the guiding opening 3311 through the coupling opening 3321, and a pair of contacting portions 3332. The push plate 333 is guided by the guiding member 331 and is adapted to eject the hard disk 2. The pushing bar 334 has a first end portion 3341 exposed from the housing 1 for operation by the user so as to push the pivot plate 332 and to eject the hard disk 2, and an opposite second end portion 3342 connected to the actuated portion 3323 of the pivot plate 332.

Figure 3:
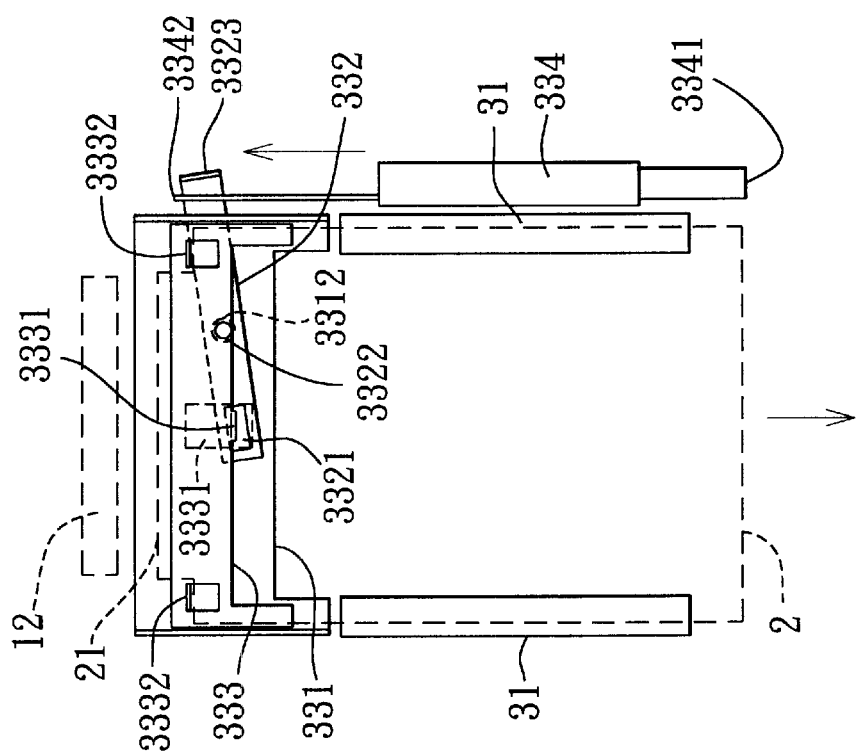
FIG. 3 is a schematic view of the preferred embodiment showing a state where a hard disk is inserted into the guide/ejector device.
Figure 5:
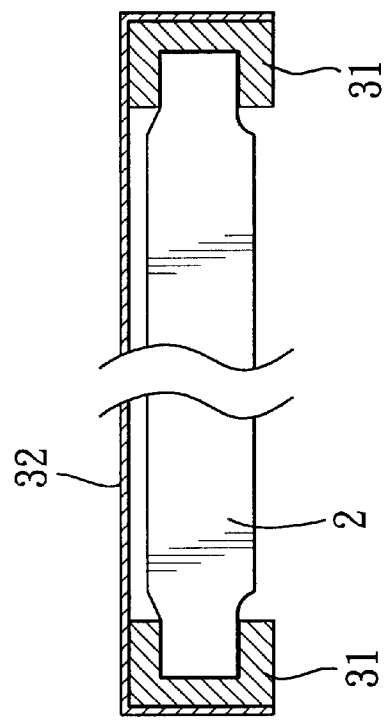
FIG. 5 is a schematic sectional view of the preferred embodiment.

Referring to FIGS. 1, 2 and 3, when installing the hard disk 2 into the portable personal computer, the hard disk 2 is extended through the opening 301 for entry into the receiving space 30. The opening 301 is closed by the disk door 34 SO as to prevent untimely removal of the hard disk 2 from the receiving space 30. The hard disk 2 is guided forward by the guiding tracks 31, and the electrical connecting end portion 21 of the hard disk 2 subsequently connects electrically to the electrical connector 12. At the same time, the contacting portion 3332 of the push plate 333 is pushed to be disposed proximate to the electrical connector 12 so as to locate the pivot plate 332 in the state shown in FIG. 3. As shown in FIG. 5, therefore, the hard disk 2 can be provided with the shockproofing effect by virtue of the guiding tracks 31 that cover the sides of the hard disk 2.

Figure 4:
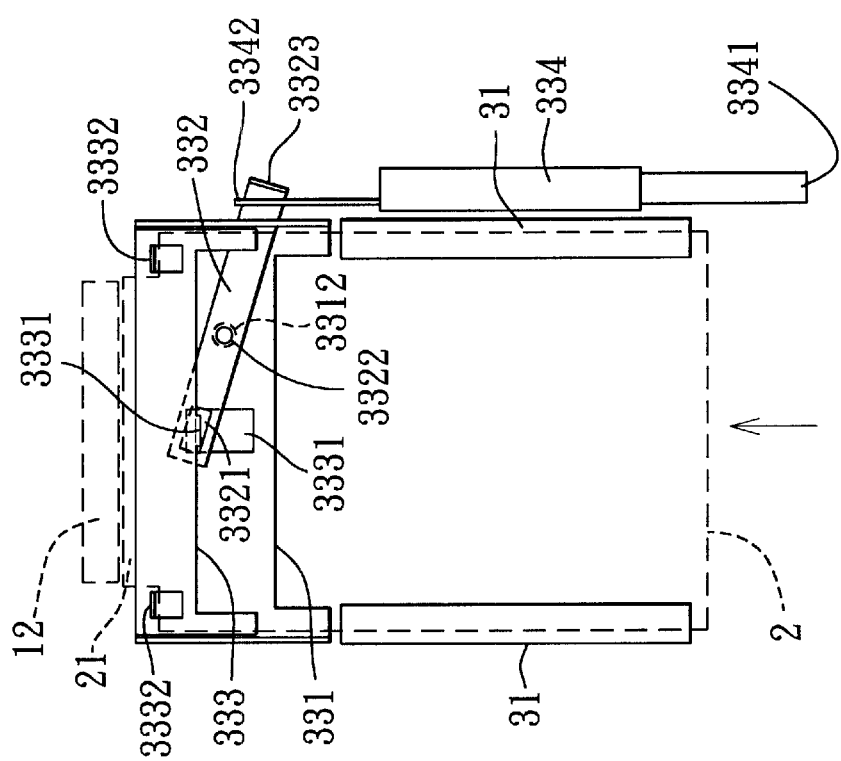
FIG. 4 is a schematic view of the preferred embodiment showing a state where the hard disk is ejected from the guide/ejector device.

Referring to FIG. 4, when it is desired to eject the hard disk 2 from the receiving space 30, the first end portion 3341 of the pushing bar 334 is pushed, and the second end portion 3342 of the pushing bar 334 push in turn the actuated portion 3323 of the pivot plate 332 in a direction toward the electrical connector 12. The coupling opening 3321 of the pivot plate 332 is then moved in a direction away from the electrical connector 12. Since the flange 3331 of the push plate 333 extends into the coupling opening 3321 of the pivot plate 332 and the guiding opening 3311 of the guiding member 331, the contacting portions of the push plate 333 will be able to push the hard disk 2 away from the electrical connector 12 so as to disconnect the hard disk 2 from the electrical connector 12. Therefore, the hard disk 2 is ejected from the receiving space 30.

Figure 6:
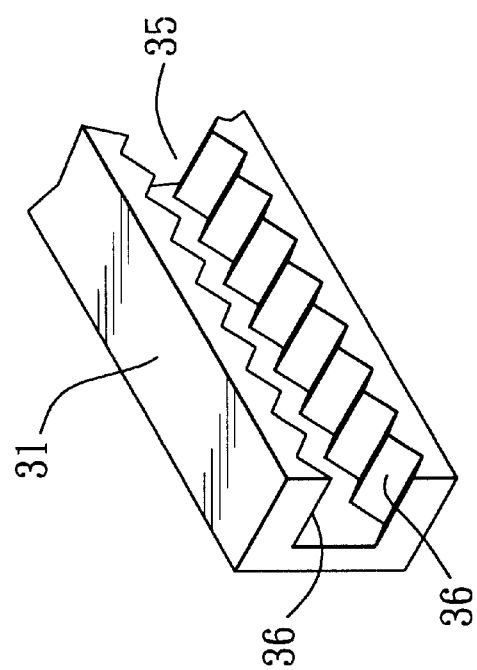
FIG. 6 is a fragmentary perspective view of a modified guiding track of the preferred embodiment.

Referring to FIG. 6, the opposed slide faces 36 of each of the guiding tracks 31 can be configured to be serrated so as to reduce the friction between the hard disk 2 and the guiding tracks 31.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A guide/ejector device for a computer which includes a circuit board, an electrical connector connected electrically to said circuit board, and a disk door, said guide/ejector device comprising:

a guide unit including two longitudinal guiding tracks made of a shockproof rubbery material, said guiding tracks being parallel to each other, each of said guiding tracks having a longitudinally extending recess confined by two opposing serrated slide surfaces, and defining a receiving space adapted to receive a hard disk, each of said guiding tracks having a first end portion adapted to be disposed adjacent to the disk door, and an opposite second end portion, said first end portions of said guiding tracks defining an opening adapted for insertion of the hard disk into said receiving space when connecting the hard disk to the electrical connector; and an ejecting mechanism disposed adjacent to said second end portions of said guiding tracks and adapted to eject the hard disk from the electrical connector.

2. The guide/ejector device of claim 1, wherein said guide unit further includes a top shell spanning and connecting said guiding tracks.

3. The guide/ejector device of claim 1, wherein said ejecting mechanism includes a guiding member having two opposite ends formed with two guide arms in alignment with said guiding tracks, a push plate guided by said guiding member and adapted to eject the hard disk, a pivot plate pivotally connected to said guiding member to move said push plate, and a pushing bar for pushing said pivot plate.

4. An electronic apparatus, comprising:

a housing having a disk door, a circuit board disposed in said housing, and an electrical connector mounted on and connected electrically to said circuit board; and a shockproof guide/ejector device including:

a guide unit including two longitudinal guiding tracks made of a shockproof rubbery material, said guiding tracks being parallel to each other, and defining a receiving space adapted to receive a hard disk, each of said guiding tracks having a first end portion adapted to be disposed adjacent to said disk door, and an opposite second end portion, said first end portions of said guiding tracks defining an opening aligned with said disk door, each said guiding tracks having a longitudinally extending recess confined by two opposing serrated slide surfaces, and an ejecting mechanism disposed between said guiding tracks and said electrical connector.

5. The electronic apparatus of claim 4, wherein said guide unit further includes a top shell spanning and connecting said guiding tracks.

6. The electronic apparatus of claim 4, wherein said ejecting mechanism includes a guiding member having two opposite ends formed with two guide arms in alignment with said guiding tracks, a push plate guided by said guiding member and adapted to eject the hard disk, a pivot plate pivotally connected to said guiding member to move said push plate, and a pushing bar for pushing said pivot plate.

* * * * *